Oct. 13, 1964  K. M. ALLEN ETAL  3,152,655
MAGNETIC SCALE APPARATUS
Filed May 15, 1961  2 Sheets-Sheet 1
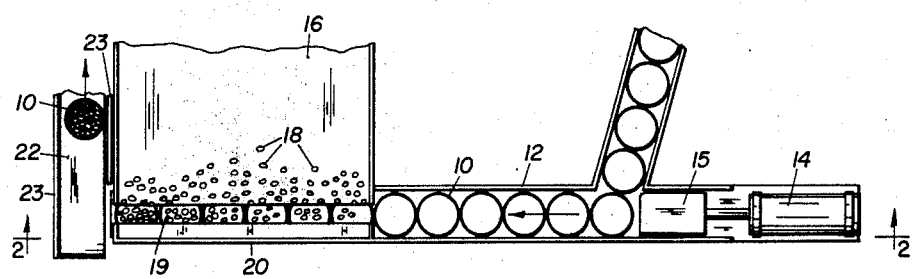
Fig. 1
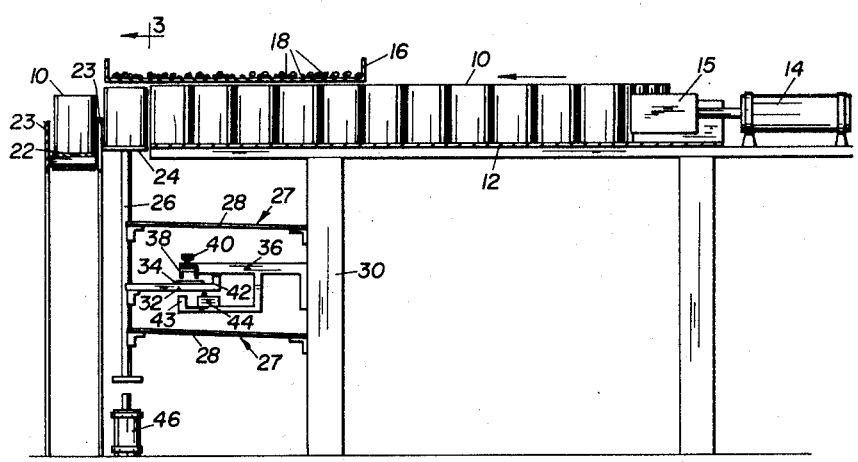
Fig. 2
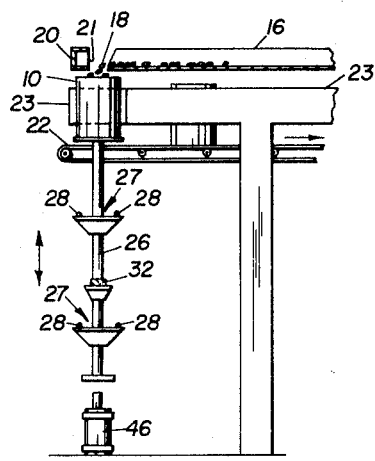
Fig. 3
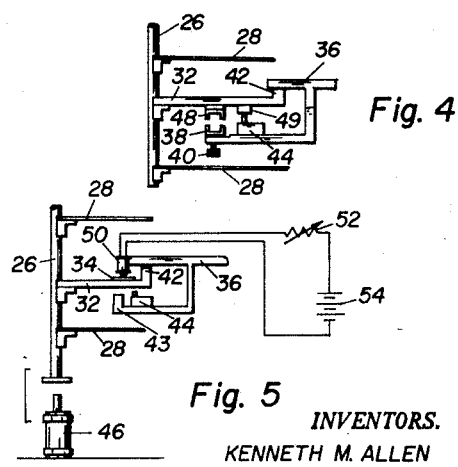
Fig. 4
Fig. 5
INVENTORS.
KENNETH M. ALLEN
CHESTER H. HARPER
BY
BUCKHORN, CHEATHAM & BLORE
ATTORNEYS

INVENTORS.
KENNETH M. ALLEN
CHESTER H. HARPER

BY

BUCKHORN, CHEATHAM & BLORE
ATTORNEYS

United States Patent Office 3,152,655
Patented Oct. 13, 1964

3,152,655
MAGNETIC SCALE APPARATUS
Kenneth M. Allen and Chester H. Harper, both of Newberg, Oreg., assignors to Allen-Harper, Inc., Portland, Oreg., a corporation of Oregon
Filed May 15, 1961, Ser. No. 109,919
4 Claims. (Cl. 177—52)

The subject matter of the present invention is related generally to apparatus for determining the weight of an object and in particular to a magnetic scale apparatus for determining whether the weight of an object exceeds a predetermined minimum value.

The magnetic scale of the present invention is especially useful for filling a container with material over a minimum weight or for the separation of a plurality of objects by their relative weights, and such apparatus is described in these environments. However, it should be understood that the magnetic scale of the present invention has many other uses than those illustrated. Scale apparatus previously used for commercial weighing has had many disadvantages. A few of the more important of these disadvantages include inaccuracy of results, slowness of operation in addition to the cost of complicated conventional apparatus. While previous weighing apparatus has solved some of the above problems, none has proved entirely satisfactory.

The magnetic scale of the present invention overcomes the above discussed disadvantages of previous weighing apparatus so that such magnetic scale is very accurate, fast in operation, simple and inexpensive. Broadly this magnetic scale includes a movable member adapted to hold the object to be weighed, a stationary support structure connected to such movable member, a magnet to produce a magnetic field between said movable member and said support structure to hold said movable member in an upper position, and a means to vary the force of said magnetic field so that such force may be adjusted to a predetermined value which may be overcome by the weight of the object on the movable member in order to move such movable member from the upper position to a lower position when the weight of such object exceeds such predetermined value. Thus, the magnetic scale responds by abrupt movement when the weight of the object exceeds a predetermined minimum value so that it gives extremely accurate results in a minimum operating time and produces substantial savings in cost for commercial uses, such as container filling and object sorting.

Therefore, one object of the present invention is to provide an improved magnetic scale apparatus.

Another object of the invention is to provide a scale apparatus using a magnetic field for determining whether or not an object weighs more than a predetermined value and providing abrupt movement of the object support in such scale when the predetermined value is reached.

A further object of the present invention is to provide a magnetic scale in which an adjustment for varying the force of the magnetic field is employed in order to weigh separately a plurality of objects of different weights.

Still another object of the invention is to provide a magnetic scale apparatus for determining when a partially filled container weighs more than a minimum amount in which an adjustable spacer is employed for varying the distance between a pair of magnetic elements in such scale to vary the force of the magnetic field between such elements.

A still further object of the present invention is to provide a magnetic scale apparatus for separating a plurality of objects according to their relative weights in which a plurality of pairs of magnetic elements and a plurality of adjustable spacer cams are employed to vary the force of the magnetic fields between such pairs of magnetic elements.

Additional objects and advantages of the present invention will become apparent after referring to the following detailed description of certain preferred embodiments of the invention and to the attached drawings, of which:

FIG. 1 is a partial plan view of one embodiment of a magnetic scale apparatus for determining when the weight of a partially filled container exceeds that of a predetermined minimum value;

FIG. 2 is a vertical sectional view taken along line 2—2 of FIG. 1 showing one embodiment of the magnetic scale including a pair of magnetic elements to provide a magnetic field having a force of attraction between such elements;

FIG. 3 is a vertical section taken along the line 3—3 of FIG. 2;

FIG. 4 is a fragmentary view similar to a portion of FIG. 2 of an alternative embodiment for the magnetic scale of FIGS. 1 to 3, using a pair of magnets positioned positioned to repel each other;

FIG. 5 is a fragmentary view similar to FIG. 4 of still another embodiment of the magnetic scale in the apparatus of FIGS. 1 to 3, using an electromagnet rather than a permanent magnet;

FIG. 9 is a fragmentary horizontal sectional view taken along the line 9—9 of FIG. 8.

Figure 6:
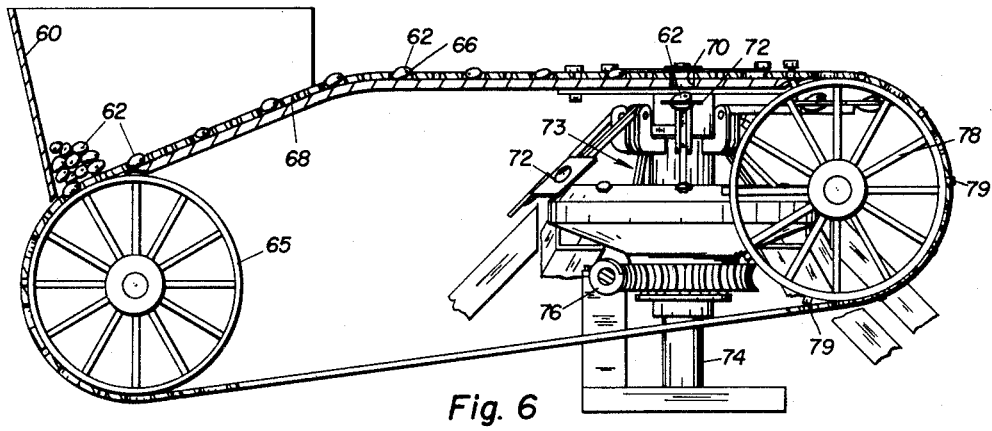
FIG. 6 is a vertical sectional view of a magnetic scale apparatus for separating a plurality of objects according to their relative weights.

The embodiment of the magnetic scale apparatus of the present invention shown in FIG. 1 is an apparatus for determining when the weight of a partially filled container exceeds a preedtermined minimum value as it is being filled. This magnetic scale apparatus includes a plurality of containers 10 which may be moved along a conveyer table 12 by a feed mechanism in the form of a hydraulic cylinder 14 and pusher 15. A material feeder 16, such as a vibrating conveyer, gradually fills the containers 10 with material 18 as they pass beneath the outlet end of such feeder and under a slot 19 between the material stop member 20 and such outlet end. After the containers are filled by material 18 passing through the slot 19 between the stop member 20 and the feeder 16, they are weighed by the magnetic scale and then ejected into a discharge conveyer belt 22, which has a guide rail 23 on each side thereof, by means of the hydraulic cylinder 14.

The magnetic scale for weighing containers 10 and determining when the feed cylinder 14 should be actuated is shown in greater detail in FIG. 2. This scale includes a movable platform 24 rigidly secured to a scale member 26 which is supported by a pair of guide structures 27 mounted on a stationary frame 30. The guide structures 27 may be rigid members pivotally mounted at both ends to the scale member 26 and the stationary frame 30. However, the preferred construction of each guide structure 27 includes two thin, flexible spring rod elements 28 positioned on opposite sides of the scale member 26 and having their opposite ends secured to the stationary frame 30 and to the scale member 26, as shown in FIG. 3. These guide elements 28 restrict the horizontal movement of the scale member 26 and the scale platform 24 without imposing any substantial amount of resistance to movement in the vertical direction.

The scale mechanism also includes a first support arm 32 rigidly attached at one end to the scale member 26 and a magnet or armature element of ferromagnetic material 34 mounted thereon. A second support arm 36 is rigidly mounted by one end on the stationary frame 30 and adjustably supports a permanent magnet 38 on the other end thereof above magnetic element 34. The distance between the magnet 38 and the magnetic element 34 may be varied by means of an adjustable spacer screw 40 which is screw threaded through a portion of the support arm 36 in order to adjust the force of magnetic attraction between the magnet 38 and the magnetic element 34. Such force is great enough to hold the first support arm 32 in the position shown and a fixed spacer stop 42 on the support arm 32 engages support arm 36 to prevent the magnet 38 and magnetic element 34 from coming into contact and to position the top of platform 24 just below the top of conveyor 12. Since adjustment of the spacer screw 40 controls the force of the magnetic field existing between these members, the setting of such spacer screw 40 controls the weight of the container 10 on the scale platform 24 which is necessary to overcome the force of the magnetic field and to move the scale platform down to a lower position from the upper position shown.

When the container 10 on the scale platform 24 has been filled so that it weighs at least as much as the predetermined minimum amount fixed by the spacer screw 40, the scale platform moves abruptly down to a position slightly above the discharge conveyor 22 which is determined by the stop 43 mounted on another portion of the support arm 36 below the support arm 32. A stop switch 44 also mounted on the stop 43, is depressed by contact with the support arm 32, and causes operation of the hydraulic feed cylinder 14 by a suitable electrical circuit means (not shown). Operation of the cylinder 14 moves the pusher 15 outward into engagement with the row of containers 10 until the filled container on the scale platform 24 is pushed off such platform onto the discharge conveyor belt 22 by a subsequent container which takes its place upon the scale platform.

For extreme accuracy, it is necessary that the guide elements 28 be very flexible so that they support very little weight of the scale in order for there to be an abrupt movement when the force of attraction of the magnetic field is overcome by the weight of the container. In such cases it is desirable to have a scale platform return device, such as a hydraulic cylinder 46. This return cylinder may be operated by the switch 44 after a slight time delay by the circuit means referred to above so that it raises the scale member 26 until the stop 42 on the support arm 32 is in contact with the support arm 36. However, for less accurate scales it is possible to make the guide elements 28 of sufficient resiliency so that they act as springs to return the scale platform 24 to its upper position, without the use of the return cylinder 46, when the filled container is removed therefrom by an unfilled container.

An alternative method of providing the magnetic field for the magnetic scale apparatus of FIGS. 1 to 3 is shown in FIG. 4. In this embodiment the adjustable magnet 38 is moved from the upper portion of the support arm 36, as shown in FIG. 2, to the bottom portion of the support arm 36 adjacent the stop switch 44. An additional permanent magnet 48 and stop spacer 49 are placed on the lower surface of the support arm 32 above magnet 38 so that the magnetic field produced between the two magnets produces a repulsion force on support arm 32 to hold the platform 24 up during its unloaded condition as shown. Since the magnetic repulsion force between the upper magnet 48 and the lower magnet 38 resists any downward movement of the scale platform 24 and causes it to move in the position shown after the full container is removed from such platform, the scale platform return device 46 is not necessary. It should be noted that when magnetic repulsion is used, the operation of the magnetic scale is somewhat different than that of FIG. 2 since there is no abrupt movement of the scale when the weight of the filled container 10 exceeds the repulsion force of the magnetic field. In this embodiment, the scale platform 24 moves gradually downward until the switch 44 is activated by stop 49, since a downward movement of the platform causes an increase in the magnetic field between magnets 48 and 38 and not a decrease in magnetic field as in FIG. 2 embodiment.

Another means for producing the magnetic field is shown in FIG. 5. This embodiment differs from FIG. 2 only in the fact that the adjustable permanent magnet 38 and spacer screw 40 have been replaced by an electromagnet 50. Adjustment of the magnetic field is accomplished by varying the electrical current through the windings of the electromagnet 50 by means of a variable resistance 52, such as a rheostat, connected between such electromagnet and voltage source 54, which may be either an A.C. or D.C. voltage source depending upon the type of electromagnet used. Adjustment of the rheostat 52 varies the current through the electromagnet 50 and changes the force of the magnetic field between magnet 50 and magnetic material 34.

The magnetic scale of the present invention may be used in an apparatus for separating a plurality of objects, such as various foodstuffs including fruit, nuts and vegetables, according to their relative weights, as shown in FIG. 6. This separation apparatus may include a hopper 60 for the objects to be separated having a plurality of objects 62 of different weights therein such as, for example, olives of varying size. The olives 62 may be transported to the magnetic scale by means of a conveyor belt 64 mounted upon an idler wheel 65 below the hopper 60 and having apertures 66 therein to receive the olives. The receiving apertures 66 in the conveyor belt 64 are larger than the biggest object to be weighed and the olives 62 are supported on a conveyer table 68 until such olives reach a point adjacent the magnetic scale where a hole 70 is provided in the conveyer table in order to allow the olive 62 to drop from the conveyer belt 64 through the aperture 66 and the hole 70 onto a receiver plate 72 forming part of a magnetic scale. Such magnetic scale is mounted on a rotor 73 journalled on and rotated about a stationary shaft 74 by means of a worm gear drive 76. The conveyer belt 64 is also mounted upon a drive wheel 78 which is driven in timed relation with the rotor 73 from a suitable power source (not shown), the drive wheel 78 having radially extending pins 79 engaging in suitable apertures in the belt 64 to maintain synchronism between the movement of the belt and the rotation of the rotor 73.

Figure 7:
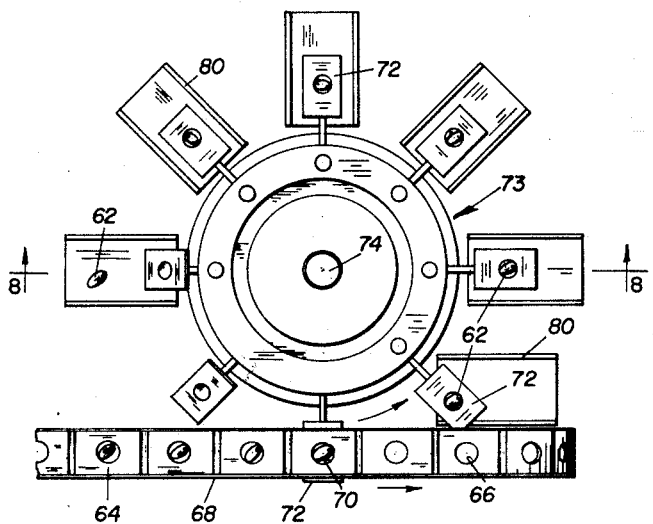
FIG. 7 is a plan view of a portion of the apparatus of FIG. 6.

As shown in FIG. 7, a plurality of the receiver plates 72 extend radially from the rotor 73, which may rotate in a counterclockwise direction so that they are successively brought into position to receive an olive 62 when dropped through the hole 70 in the conveyer table 68 by the conveyer belt 64 moving to the right, as indicated by the arrows. The receiver plates 72 drop the olives into discharge chutes 80 depending upon the weight of such olives. The heaviest olive 62 is dropped into the first discharge chute 80 while the lightest olive 62 is deposited in the last discharge chute 80 over which the receiver plates 72 pass after receiving such objects, so that each discharge chute removes a different weight class of olives from the magnetic scale.

Figure 8:
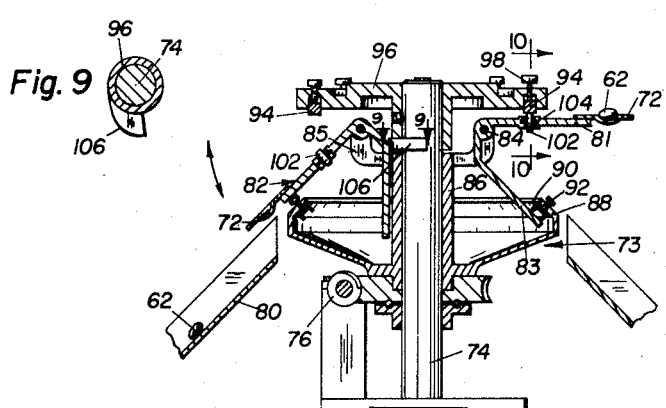
FIG. 8 is a vertical sectional view taken along the line 8—8 of FIG. 7.

The details of each magnetic scale of the sorting apparatus are more readily understood by referring to FIG. 8 of the drawing, which shows that each receiver plate 72 is secured to the upper leg 81 of a V-shaped pivotal support 82 having a lower leg 83, the support 82 being pivoted about pin 84 on the rotor 73. The pivot pin 84 attaches the pivotal support 82 to a radially extending arm portion 85 of a sleeve 86 forming part of the rotor 73 for rotation with such rotor about the stationary shaft 74 by means of the worm gear drive means 76 referred to above. The rotor 73 also has a circular flange portion 88 extending radially from the shaft 74. A plurality of magnets 90 are secured to spaced positions on the periphery of the flange 88 corresponding to the positions of the pivotal members 82 supported on the arms 85. These magnets 90 may be conventional permanent magnets supported by adjusting screws 92 threaded through the flange 88. The adjustable magnets 90 are positioned to exert a magnetic force of attraction on the lower leg 83 of the pivotal member 82 when the receiver plate 72 is held in the substantially horizontal position shown in FIG. 8 to the right of shaft 74, such lower leg being of ferromagnetic material. It will be apparent that the adjusting screws 92 can be used to adjust the magnetic force on the legs 83 of pivotal members 82.

In order to adjust the magnetic force between the magnets 90 and the lower legs 83 of pivotal members 82 so that the weight of the object 62 overcomes the force of such magnetic field at varying discharge chutes 80 according to the weight of object 62, a plurality of adjustable cam members 94 are provided on a mounting plate 96 rigidly secured to the upper end of the stationary shaft 74. The distance that each cam member 94 extends below the lower surface of the mounting plate 96 is determined by the setting of a cam adjusting screw 98 threaded through the mounting plate 96. Such cam members 94 are each contained in a recess 100 in the plate 96 so as to be guided by the walls of such recess. A cam follower 102 in the form of a roller is rotatably mounted on a pin 104 mounted in each of the upper legs 81 of pivotal members 82 in such a position as to engage the cam member 94 during rotation of the rotor 73.

Figure 10:
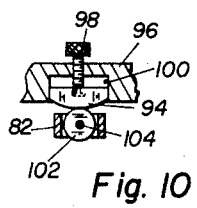
FIG. 10 is a fragmentary vertical sectional view taken along line 10—10 of FIG. 8.

During the rotation of the rotor 73 about shaft 74, the cam follower 102 rolls upon the lower surface of the mounting plate 96 until it engages a cam member 94 as shown in FIG. 10. At this position the pivotal member 82 is moved downward slightly for a distance determined by the extent to which the cam member 94 extends below the surface of the plate 96. The pivotal member 82 thus pivots about the pin 84 for a short distance so that the spacing between the magnet 90 and the lower leg 83 of the member 82 is increased. This increase in spacing causes a decrease in the force of attraction exerted by the magnetic field between magnet 90 and pivotal member 82 so that if the weight of the object 62 is great enough to overcome the force of the decreased magnetic field, the pivotal member 82 continues to pivot downward or clockwise until the olive 62 is discharged from the receiver plate 72 into the discharge chute 80, as shown in FIG. 8 to the left of shaft 74. Therefore, it is clear that the adjustment of the cam member 94 determines both the minimum weight of the object 62 before discharge of such object and the place where this discharge occurs.

After discharge of the object 62, the pivotal member 82 must be returned to its original substantially horizontal position before it can receive another object from the conveyer belt 64. This return may be accomplished by means of a fixed cam member 106 rigidly secured to plate 96 on stationary shaft 74. This fixed cam member 106 is shown in detail in FIG. 9 as extending gradually from the shaft 74 for an increasing distance beginning at a position after the last chute 80 and continuing until it reaches a maximum at a position corresponding to that where the object 62 is dropped onto the receiver plate 72 from the conveyer belt 64. As the leg 83 of the pivotal member 82 which is rotated to its lower discharge position engages the cam 106, the leg 83 is forced upward by the cam 106 as it moves along the cam surface until the receiver plate 72 is in a generally horizontal position, at which time the cam stops and the magnet 90 holds the leg 83 by magnetic attraction.

Many variations in the details of the preferred embodiments of the present invention described above will be apparent to those having ordinary skill in the art. Therefore, it is not intended to limit the scope of the invention by the preceding detailed description of preferred embodiments thereof, but that scope should be determined only by the following claims.

We claim:

1. Magnetic scale apparatus for determining whether a container of predetermined width being filled on said scale weighs more than a predetermined amount comprising:

conveyor means having a width transverse to its direction of feed greater than the width of a plurality of said containers, for feeding material to fill a plurality of said containers positioned at the output end of said conveyor;

a scale platform positioned adjacent one side of the output end of said conveyor and adapted to hold one of said containers in position to receive material from said conveyor means while on said platform;

a support means for supporting said platform for movement in a direction having a vertical component;

supply means for moving said containers in a line beneath the edge of the output end of said conveyor means to said one side from the opposite side thereof and onto the scale platform so as to partially fill said containers with said material before placing them successively on said platform;

magnet means including a first magnetic element attached to said support means and a second magnetic element attached to said platform for producing a magnetic field of attraction between said first and second magnetic elements to hold said platform in an upper position by the force of attraction of said magnetic field;

said support means including means to permit downward movement of said platform from said upper position to a lower position when the weight of the filled container on said platform overcomes the force of attraction of said magnet means and also to permit movement of said magnetic elements away from each other, said magnetic elements being characterized by having a force of attraction therebetween which decreases with increasing distance between said magnetic elements so that the downward movement of said platform occurs abruptly when said force of attraction is overcome.

2. Magnetic scale apparatus for determining whether a container of predetermined width being filled on said scale weighs more than a predetermined amount, comprising;

feeder means for feeding material to the output end thereof simultaneously to fill a plurality of said containers positioned at said output end;

a scale platform structure adapted to hold one of said containers positioned at one side of the output end of said feeder means to enable said one container to be filled on said platform structure;

a fixed support means for supporting said scale platform structure for movement in a direction having a vertical component;

supply means for moving said containers in a line from the other side along beneath the output end of said feeder means to said one side of said output end and onto said platform structure to partially fill said containers with said material before placing them successively on said platform structure;

a magnet means including a first magnetic element attached to said support means and a second magnetic element attached to said platform structure for producing a magnetic field between said first and second magnetic elements to provide a force of attraction between said platform structure and said support means to hold said platform structure in said upper position substantially entirely by the force of attraction of said magnetic field;

means for limiting the vertical movement of said scale platform structure between upper and lower limit positions so that said first and second magnetic elements are spaced from one another in said upper limit position;

said support means including means to permit downward movement of said platform structure from said upper position to a lower position when the weight of said object overcomes the force of attraction of said magnet means and also to permit movement of said magnetic elements away from each other, said magnetic elements being characterized by having a force of attraction therebetween which decreases with increasing distance between said magnetic elements so that the downward movement of said scale platform structure occurs abruptly when said force of attraction is overcome.

3. Magnetic scale apparatus for determining whether a container being filled on said scale weighs more than a predetermined amount, comprising:

a feeder means for feeding material to the output end thereof to fill a plurality of containers simultaneously at said output end;

a scale platform structure adapted to hold a container beneath one side of the output end of said feeder means;

means for moving a plurality of containers to be filled along the output end of said feed means and successively onto said scale platform so as to partially fill said containers before placing them on said platform;

a fixed support means for supporting said scale platform structure between upper and lower limit positions;

magnet means including a first magnetic element attached to said support means and a second magnetic element attached to said platform structure for producing a magnetic field between said first and second magnetic elements to provide a force of attraction between said platform and said support means to hold said platform structure in said upper limit position substantially entirely by the force of attraction of said magnetic field;

said magnetic elements being spaced from one another in the said upper limit position of said platform structure;

means for automatically feeding said material into said container when said container is on said platform structure;

said support means including means to permit downward movement of said scale platform structure from said upper position to said lower position when the weight of said container and contents is greater than the force of attraction of said magnet means and also to permit movement of said magnetic elements away from each other, said magnetic elements being characterized by having a force of attraction therebetween which decreases with increasing distance between said magnetic elements so that the downward movement of said scale platform structure occurs abruptly when said force of attraction is overcome; and means actuated by the movement of said platform structure to said lower position to automatically remove said container from said platform structure immediately after it reaches said lower position to stop the filling of said container, and to feed a new container from said supply onto said platform structure, and to return said platform structure to said upper position.

4. Magnetic scale apparatus for determining when a container being filled on said scale weighs more than a fixed minimum amount, comprising:

a movable platform adapted to hold said container, conveyor means to move said container onto said platform and subsequently off said platform, feeder means to gradually fill said container with material while it is moving to said platform and after it it on said platform, a support member rigidly secured to said platform and adapted to support said platform for movement thereof, a fixed support structure adapted to support said platform for movement relative to said structure, a plurality of flexible guide elements attached between said member and said structure to control the substantially vertical movement of said platform, a pair of support arms each having a magnetic element thereon with one of said arms attached to said support member and the other of said support structure so that said magnetic elements are positioned adjacent to one another to hold said platform in an upper first position by the force of attraction of a magnetic field produced between said magnetic elements, means for adjusting the magnetic field between said magnetic elements in order to hold said platform in said upper first position until the weight of said container exceeds a predetermined value and overcomes the force of said magnetic field to quickly move said platform from said first position to a lower second position, return means for moving said platform up from said second position back to said first position in order to enable the weighing of another container, and switch means responsive to the movement of said platform into said second position to energize said conveyer means for immediate removal of the container from the platform to stop filling it and to activate said return means for the return of said platform to said first position after said removal of said container.

References Cited in the file of this patent

UNITED STATES PATENTS

| | | |
|---|---|---|
| 2,148,523 | Baermann | Feb. 28, 1939 |
| 2,279,076 | Sutton | Apr. 7, 1942 |
| 2,333,790 | Howard | Nov. 9, 1943 |
| 2,559,919 | Gustafsson | July 10, 1951 |
| 2,860,847 | Willbrandt | Nov. 18, 1958 |
| 2,947,417 | Reynolds | Aug. 2, 1960 |
| 3,000,500 | Kitson | Sept. 19, 1961 |
| 3,053,332 | Buchtenkirch et al. | Sept. 11, 1962 |
| 3,073,400 | Bauder et al. | Jan. 15, 1963 |

FOREIGN PATENTS

| | | |
|---|---|---|
| 588,624 | Canada | Dec. 8, 1959 |
| 652,780 | Germany | Nov. 6, 1937 |